June 5, 1962　　　　L. J. COOPER　　　　3,037,744
WIRE PULLING GUIDE
Filed May 11, 1956

INVENTOR.
Leo J. Cooper
BY
Attorneys

United States Patent Office 3,037,744
Patented June 5, 1962

3,037,744
WIRE PULLING GUIDE
Leo J. Cooper, 151 Josiah Ave., San Francisco, Calif.
Filed May 11, 1956, Ser. No. 584,354
3 Claims. (Cl. 254—134.3)

This invention relates generally to wire pulling apparatus and more particularly to a wire pulling guide.

In wiring homes, buildings and the like, it is frequently necessary to pull wire into a conduit box and through conduit to the other outlet. In conventional wire pulling practice, a man is required at each end of the conduit run; one man pulls the fish tape through the conduit, whereas the other man feeds the wire into the conduit as it is pulled through to prevent it from kinking and to prevent the insulation from being scraped off of the wire. The use of two men for such a simple operation is objectionable.

In general it is an object of the present invention to provide a wire pulling guide which will make it possible for a single man to pull electrical wiring through a conduit.

Another object of the invention is to provide a wire pulling guide of the above character which can be disposed in one end of a conduit run or in a conduit box to facilitate the feeding of the wire into the conduit box and conduit run.

Another object of the invention is to provide a wire pulling guide of the above character which serves to protect insulation as the wire is pulled into the conduit.

Another object of the invention is to provide a wire pulling guide of the above character which serves to keep the wire being pulled away from the walls and ceiling of the room to prevent marring of the walls and ceiling.

Another object of the invention is to provide a wire pulling guide of the above character which facilitates pushing of the fish tape through the conduit and which serves to prevent injury to the hands as the fish tape is pushed into the conduit.

Additional objects and features of the invention will appear from the following description in which the preferred embodiment has been set forth in detail in conjunction with the accompanying drawing.

Figure 1:
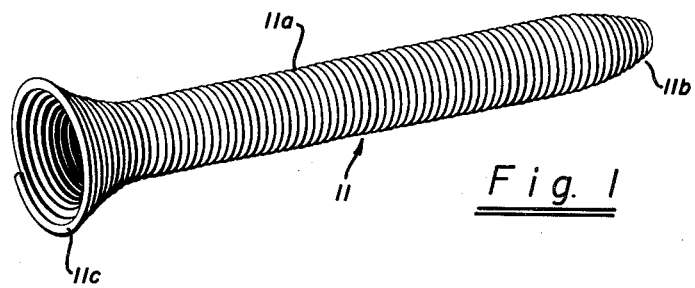
FIGURE 1 is a perspective view of a wire pulling guide incorporating the present invention.
Figure 2:
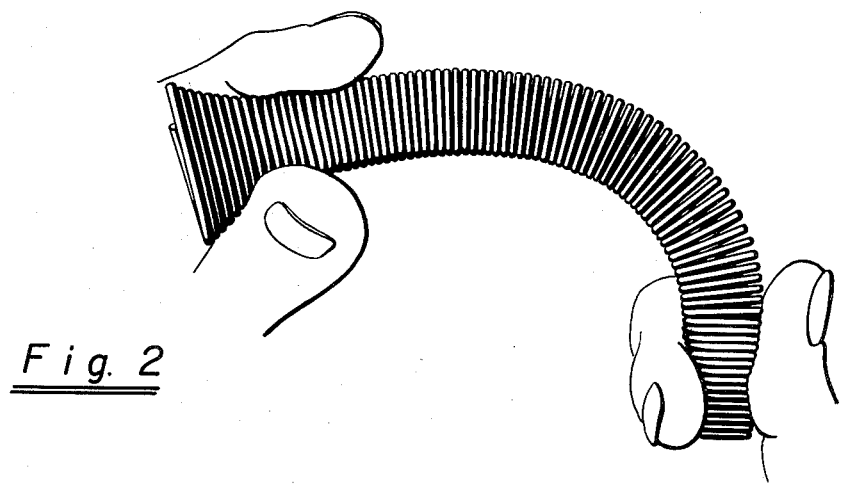
FIGURE 2 is a side elevational view of the wire pulling guide shown in FIGURE 1 and illustrates the flexibility of the guide.

As shown in the drawing, the wire pulling guide consists of an elongated hollow flexible member 11. The flexible member 11 is provided with an elongated tubular portion 11a, a tapered end portion 11b, and a flared end portion 11c.

The flexible member 11 can be formed of any suitable material such as oil tempered spring wire. The member, as shown, is formed of one conduit length of spring wire which has been helically coiled to provide the flared portion 11c, the tubular portion 11a, and the tapered portion 11b.

The member may also be formed of any desired size. One size found to be suitable was formed of #14 gauge oil tempered spring wire and had a length of approximately 7". The flared or bell shaped portion of the member had a maximum inside diameter of approximately 1¼", the tubular portion 11a had an inside diameter of approximately ⅝" and the tapered portion 11b had a minimum inside diameter of approximately ½". The size of the wire pulling guide is determined primarily by the size of the wires to be pulled through the guide.

Operation of my wire pulling guide may now be described as follows: Let it be assumed that a fitting 13 has been mounted in a conduit box 14 and connected to a run of conduit 16 and that it is desired to pull one or more wires into the conduit box and through the conduit run. The tapered end 11b of the wire pulling guide is first inserted into the fitting 13. It is apparent that the tapered end 11b makes possible the use of the wire pulling guide in conventional conduit boxes with different sizes of fittings or in concrete and explosion proof boxes which have threaded hubs but no fittings.

One end of the fish tape 17 to be used for pulling the wires through the conduit is inserted in the flared end 11c of the wire pulling guide and is pushed through the conduit run 16. While the fish tape is being pushed through the conduit, the wire pulling guide serves to keep the fish tape away from the wall and the conduit box. The guide thus serves to prevent marring of the walls during the wire pulling and at the same time serves to protect the hands from being accidentally scraped on the sharp edges of the conduit box.

The wire pulling guide also facilitates pushing of the fish tape into the conduit because the guide provides a smooth bend or curve for forcing the fish tape into the conduit and thus prevents binding or kinking of the fish tape.

Figure 3:
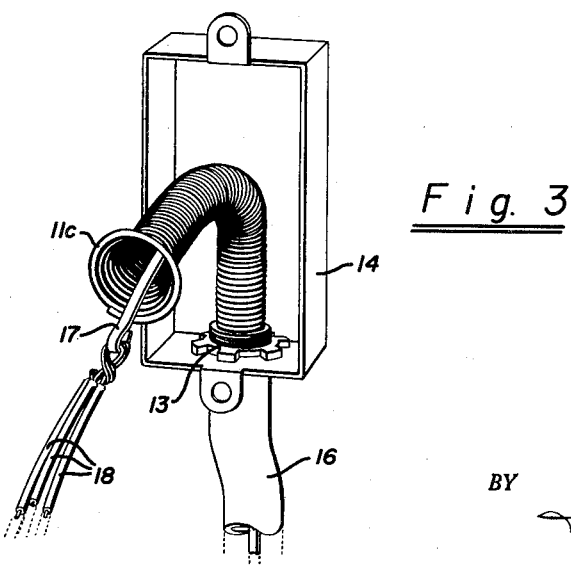
FIGURE 3 is a perspective view of the wire pulling guide being used for pulling wire into a conduit box and conduit run.

As soon as substantially all of the fish tape has been pushed through the conduit 16, the wires 18 are connected to the end of the fish tape as shown in FIGURE 3. The wires and the fish tape are then pulled into the flared end of the wire guide. The weight of the wire causes the flared or bell shaped end of the wire pulling guide to be bent in the direction from which the wire is being pulled. The flared end of the wire pulling guide is therefore what may be called "self centering" and is always in a position in which it is particularly adapted to receive the wires 18 when they are pulled into the conduit, as shown in FIGURE 3. It will also be noted that the bending of the wire pulling guide provides a smooth curve for movement of the wires 18 from one plane into a plane substantially coincident with the axis of the conduit 16. The flared end of the guide serves to generally center the wires as they are pulled into the guide and therefore also facilitates pulling.

As soon as the wires have been attached to the fish tape the electrician goes to the other end of the conduit run and pulls on the fish tape to pull the wires 18 through the conduit. The wires 18 are readily pulled into the conduit because the wire pulling guide provides a curve of the large radius which permits easy pulling.

In addition to facilitating pulling of the wires into the conduit, the wire guide serves to keep the wires away from any wall or ceiling which the conduit box 14 may be adjacent. The wire guide thus serves to prevent marring of the walls or ceiling. The wire guide keeps the wire out of contact with the sharp edges of the conduit box 14 to prevent tearing or scraping of the insulation on the wires.

It is apparent from the foregoing that I have provided a wire pulling guide which makes it possible for one man to easily pull the wire through a conduit run from outlet to outlet without damaging the insulation or marring the walls.

I claim:

1. A wire pulling guide for pulling wire into conduit boxes, conduits and the like, said wire pulling guide comprising an elongate hollow flexible tubular member formed continuously of tightly wound helically coiled spring wire, one end of said member being formed of a portion of reduced diameter and being adapted to be placed into the open end of a conduit for frictional engagement therein, the other end of said member being outwardly flared in a curve of large radius to facilitate easy pulling of the wire, said member being formed so that it is normally straight but adapted for universal flexing by the wire being pulled through the guide so that the flared end of the tubular member will conform to and face in the direction from which the wire is being pulled, said member being adapted to be bent sufficiently so that the wire can be pulled from a direction approximately 180° removed from the axis of the conduit without engaging the outer edge of the flared portion, the flared end of the member facilitating entry of the wire into the member during pulling of the wire and serving to center the wire in the member to prevent scraping or tearing of the insulation on the wire.

2. A wire guide for use in pulling or feeding wire through conduit openings and the like, comprising a tightly wound helical conduit having continuous end and middle portions adapted for universal flexing in any direction, one end of which is continuously wound in a diameter smaller than that of the middle portion for frictional engagement in a conduit or terminal through which the wire may be pulled or fed and the other end terminating in an outwardly flaring bell continuously wound with the middle portion, said bell having sufficient outward curvature to provide a smooth passage of the wire therethrough and thereover without kink or damage, regardless of the angle or direction of feed or pull, and without contact with the outer edge of said bell.

3. A wire guide for use in pulling or feeding wire through conduit openings and the like, comprising a tightly wound helical conduit having two end portions and a middle portion all continuously wound and capable of flexing in any direction as a unit in response to the feed of the wire, one end of which is continuously wound in a smaller diameter than the middle portion for frictional engagement in a conduit opening and the other end terminating in an outwardly flaring bell continuously wound with the middle portion, said bell having a large radius to provide a smooth passage of the wire therethrough and thereover without kink or damage, regardless of the angle or direction of feed or pull and without contact with the outer edge of said bell.

References Cited in the file of this patent

UNITED STATES PATENTS

| | | |
|---|---|---|
| 2,515,724 | McCroskey | July 18, 1950 |
| 2,746,716 | Zachary | May 22, 1956 |
| 2,838,280 | Eyles | June 10, 1958 |
| 2,841,376 | Joy | July 1, 1958 |

FOREIGN PATENTS

| | | |
|---|---|---|
| 617,656 | Germany | Aug. 23, 1935 |